(12) United States Patent
Huang (10) Patent No.: US 7,706,282 B2
(45) Date of Patent: Apr. 27, 2010

(54) BLUETOOTH PERSONAL AREA NETWORK ROUTING PROTOCOL OPTIMIZATION USING CONNECTIVITY METRIC

(76) Inventor: Leping Huang, 1-1-1-413, Asahi, Kawaguti-shi, Saitame-ken, 332-0001, Tokyo (JP)

( * ) Notice: Subject to any disclaimer, the term of this patent is extended or adjusted under 35 U.S.C. 154(b) by 97 days.

(21) Appl. No.: 10/606,437

(22) Filed: Jun. 25, 2003

(65) Prior Publication Data

US 2004/0264466 A1    Dec. 30, 2004

(51) Int. Cl.
   *G01R 31/08* (2006.01)
(52) U.S. Cl. ........................ 370/238; 370/252
(58) Field of Classification Search .............. 370/238, 370/254, 255, 338, 351, 400, 401
   See application file for complete search history.

(56) References Cited

U.S. PATENT DOCUMENTS

| | | | | | |
|---|---|---|---|---|---|
| 4,912,702 | A | * | 3/1990 | Verbiest | 370/538 |
| 5,535,195 | A | * | 7/1996 | Lee | 370/256 |
| 5,600,794 | A | * | 2/1997 | Callon | 709/241 |
| 5,878,029 | A | * | 3/1999 | Hasegawa et al. | 370/236 |
| 6,084,858 | A | * | 7/2000 | Matthews et al. | 370/238 |
| 6,259,673 | B1 | * | 7/2001 | Yoshihara et al. | 370/238 |
| 6,370,119 | B1 | * | 4/2002 | Basso et al. | 370/252 |
| 6,535,498 | B1 | * | 3/2003 | Larsson et al. | 370/338 |
| 6,574,669 | B1 | * | 6/2003 | Weaver | 709/239 |
| 6,804,532 | B1 | * | 10/2004 | Moon et al. | 455/552.1 |
| 7,280,483 | B2 | * | 10/2007 | Joshi | 370/238 |
| 7,281,057 | B2 | * | 10/2007 | Cain | 709/238 |
| 2002/0142789 | A1 | * | 10/2002 | Kuhl et al. | 455/512 |
| 2003/0043746 | A1 | * | 3/2003 | Hiroyuki | 370/238 |
| 2003/0119538 | A1 | * | 6/2003 | Momosaki et al. | 455/517 |
| 2003/0202468 | A1 | * | 10/2003 | Cain et al. | 370/229 |
| 2003/0202477 | A1 | * | 10/2003 | Zhen et al. | 370/248 |
| 2005/0226265 | A1 | * | 10/2005 | Takatori | 370/452 |

FOREIGN PATENT DOCUMENTS

EP    1146692 A2    10/2001

OTHER PUBLICATIONS

Perkins, Royer, DAS, Ad Hoc On-Demand Distance Vector (AODV) Routing, Oct. 22, 1999.

Perkins, Royer, Qlty of Svc for Ad Hoc On-Demand Distance Vector Routing, Jul. 14, 2000.

(Continued)

*Primary Examiner*—Ricky Ngo
*Assistant Examiner*—Christine Ng (57) ABSTRACT

A method is disclosed for routing data packets in a wireless network, preferably a Bluetooth™ network. The method includes estimating a link bandwidth of at least one network node, calculating a connectivity metric based on the estimated link bandwidth, distributing information concerning the calculated connectivity metric and, using the calculated connectivity metric, determining a route having a maximum link bandwidth and a minimum traffic load. Preferably, estimating uses a model of a Bluetooth network medium access control MAC algorithm. The connectivity metric is defined as a ratio of a maximum link bandwidth to the estimated link bandwidth, where the maximum link bandwidth is the link bandwidth between a Master node and a Slave node when there is only one Slave node connected to the Master node (i.e., when there is one Slave node in the piconet with the Master node).

33 Claims, 2 Drawing Sheets

OTHER PUBLICATIONS

Perkins, Belding-Royer, DAS, Ad Hoc On-Demand Distance Vector Routing, Nov. 4, 2002.
Bluetooth, Bluetooth Network Encapsulation Protocol(BNEP)Specification, Dec. 17, 2002.
Kardach, Bluetooth Architecture Overview, XP002141146, 1998.
Haartsen, Bluetooth—The Universal Radio Interface for Ad Hoc, Wireless Connectivity, XP-000783249, 1998.
Frodigh, Johansson, Larsson, Wireless Ad Hoc Networking—The Art of Networking without a Network, XP-000969933, 2000.

* cited by examiner

BLUETOOTH PERSONAL AREA NETWORK ROUTING PROTOCOL OPTIMIZATION USING CONNECTIVITY METRIC

TECHNICAL FIELD

This invention relates generally to wireless communications systems and networks and, more specifically, relates to the connectivity of mobile nodes in a wireless personal area network (PAN), such as one based on a low power RF system known as Bluetooth™ (BLUETOOTH is a Trademark owned by Bluetooth SIG, Inc.).

BACKGROUND

The Bluetooth™ (BT) protocol has resulted from the National Telecommunications Act opening new public access to the ultra high frequency (UHF) and very high frequency (VHF) bands. As a direct consequence, wireless local area networking is rapidly evolving as the communications standard for small and mobile corporations and other organizations. An important aspect of these new wireless networks is the integration of household (and business office) appliances, laptop computers, and personal communications service (PCS) devices. This technology, called BT, seamlessly connects each intelligent appliance in a household or an office within a "piconet" (implying a very small) wireless network.

BT is an embedded, low-power, short-range, radio-frequency (RF) technology, although it can also be IR media-based with moderate bandwidth. BT is particularly attractive for exchanging data between personal devices such as cellular phones, radios, pagers, personal digital assistants, notebook computers, video and still cameras, audio players, and local area networks (LANs).

With an operating range of 10 meters or less, the reach of BT exceeds the current range of IR, but falls far short of other types of wireless networks. BT is implemented at 2.4 GHz in the Industrial, Scientific, and Medical (ISM) band.

The BT architecture integrates a combination of hardware and software into the networking device. The hardware is an embeddable module, or a module residing on a card, which interfaces with the host device. It interfaces on one side with the host and on the other side with another BT device via its RF or IR transceiver. On the host side, there are four currently identified interfaces: the universal serial bus (USB), the PC card (or PCMCIA), and two serial interfaces, UART and RS232. All of these have established standards that define the physical and logical interaction. However, the higher level interaction between the BT device and the host is defined in unique BT protocols and packets.

Figure 1:
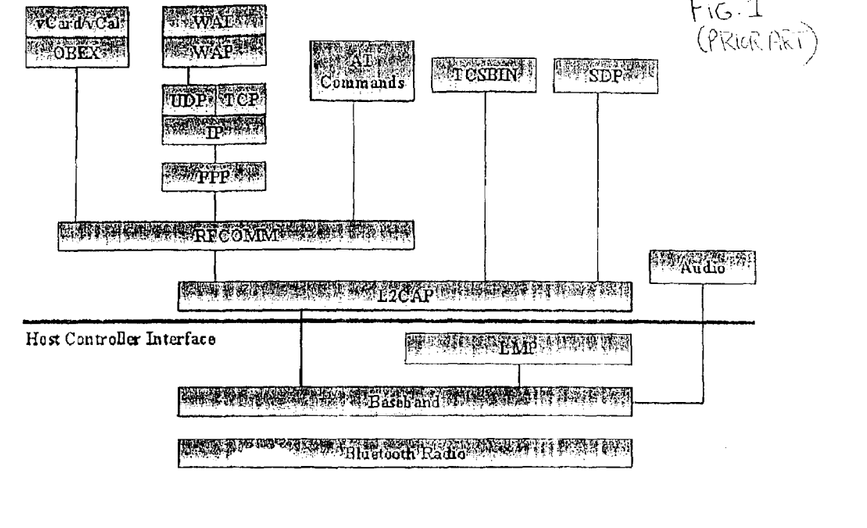
FIG. 1 is representation of a prior art Bluetooth™ protocol stack.

As can be seen in FIG. 1, the software includes salutation and security managers, a database, and the protocol stack. The transport technology is digital packet-oriented communications (rather than analog or streaming digital). Communication with the host includes hardware control and event monitor packet types. Asynchronous connection-oriented (ACO) and synchronous connection-oriented (SCO) packets are used for the link communication between devices, with SCO used primarily for real-time audio and video. Conventional packets, such as the Telephony Communications Service (TCS) and Internet Protocol (IP), are encapsulated in the BT SCO and ACO data packets, adding one more layer to the stack and therefore one more encapsulation with its overhead. Therefore, BT requires an additional protocol stack for a PC. FIG. 1 also presents an example of the required additional protocol stack. The IrDa Object Exchange (OBEX) is required for IR interoperability. Also shown is a wireless network connection to a BT device that transfers data using a User Datagram Protocol (UDP) or a Transmission Control Protocol (TCP).

Protocols, stacks, and the salutation manager provide BT "services". The salutation manager provides both server advertisement and client request capabilities, in addition to the brokering of services, and establishing and then managing the follow-on communication session for the discovery function. The salutation manager is typically independent of the processor operating system and communication protocol. The actual data transfer is under host control via the protocol stack constructed for the data type.

The BT salutation manager has a subordinate security manager, which is invoked when discovery is initiated. The security manager holds service and device security databases. It consults these databases when a request comes in for services. It also submits identifying information when a request for services goes out to another BT device.

The process of service discovery occurs as follows. A client device either attempts to browse another device's server for information, or it requests information about the server. It does this by providing a unique universal identification code. The queried device responds, depending on the security manager's decision, which is based on the device information in its database. If the device is a trusted unit according to the database, the requested information will be returned.

Although BT was originally designed as a replacement for wired connections between devices, it has evolved into a major radio interface candidate for personal area networking and proximity area networking. This is due at least in part to its low power consumption.

The basic unit of the BT piconet can only connect up to eight nodes. As such, technology has been developed that can connect multiple piconets to form a large scale network that is referred to as a scatternet. The scatternet is defined as a group of piconets in which connections exist between different piconets. The node that connects multiple piconets is referred to as a PMP (Participant in multiple piconet) in the BT specification. There are two types of PMP nodes. A PMP node that attends multiple piconets simultaneous only as a slave can be referred to as a S/S PMP, while a PMP node that attends multiple piconets simultaneously, and has a master role in one of the piconets, can be referred to as a M/S PMP.

The standardization activity with regard to personal area networks is discussed in the BT PAN Working group. The current BT Personal Area Network (PAN) profile only supports packet forwarding within one piconet. Issues regarding scatternet communication, such as how to switch between piconets (referred to as Inter-Piconet Switching, or IPS), and how to form a multi-hop network (referred to as Network Formation), and how to route packet within a scatternet (referred to as PAN routing) are still under discussion.

In general, it is a challenging task for a Bluetooth™ network to provide an ad hoc communication mechanism. This is due to the fact that Bluetooth™ has a very distinct medium access control (MAC) layer protocol that is optimized for short-range, point-to-point communication. On the other hand, many mobile ad hoc routing protocols have been proposed, such as one known as AODV (Ad Hoc On-Demand Distance Vector, see, for example, Mobile Ad Hoc Networking Working Group, Internet Draft, 22 Apr. 2000, Ad Hoc On-Demand Distance Vector (AODV) Routing", Charles E. Perkins et al.)

The basic concept of AODV is that the originator of a conversation broadcasts a Route Request (RREQ) message to search for its destination; and the node that knows the route to that destination replies to the RREQ message with a Route Reply message. The originator then selects one route for packet forwarding based on the received reply or replies.

More specifically, AODV builds routes using a route request/route reply query cycle. When a source node desires a route to a destination for which it does not already have a route, it broadcasts a route request (RREQ) packet across the network. Nodes receiving this packet update their information for the source node and set up backwards pointers to the source node in the route tables. In addition to the source node's IP address, current sequence number, and broadcast ID, the RREQ also contains the most recent sequence number for the destination of which the source node is aware. A node receiving the RREQ may send a route reply (RREP) if it is either the destination or if it has a route to the destination with corresponding sequence number greater than or equal to that contained in the RREQ. If this is the case, it unicasts a RREP back to the source. Otherwise, it rebroadcasts the RREQ. Nodes keep track of the RREQ's source IP address and broadcast ID. If they receive a RREQ which they have already processed, they discard the RREQ and do not forward it.

As the RREP propagates back to the source, nodes set up forward pointers to the destination. Once the source node receives the RREP, it may begin to forward data packets to the destination. If the source later receives a RREP containing a greater sequence number, or one containing the same sequence number with a smaller hop count, it may update its routing information for that destination and begin using the better route.

As long as the route remains active, it will continue to be maintained. A route is considered active as long as there are data packets periodically traveling from the source to the destination along that path. Once the source stops sending data packets, the links will time out and eventually be deleted from the intermediate node routing tables. If a link break occurs while the route is active, the node upstream of the break propagates a route error (RERR) message to the source node to inform it of the now unreachable destination(s). After receiving the RERR, if the source node still desires the route, it can reinitiate route discovery.

AODV maintains routes for as long as the route is active. This includes maintaining a multicast tree for the life of the multicast group. Because the network nodes are mobile, it is likely that many link breakages along a route will occur during the lifetime of that route.

Most conventional routing algorithms use a number of hops to find the best route in the network. However, such multi-hop routing protocols, if implemented in a Bluetooth™ network directly, will be very inefficient, as they do not consider the Bluetooth™ network characteristics, e.g., the fact that the traffic in a Bluetooth™ network is centralized on the architectural model of the Master node and the PMP (Participant in Multiple Piconet) node.

In general, in most typical piconets the Master node does not communicate with any one particular Slave node using the maximum data transfer speed, as it is required to also service other Slave nodes. Furthermore, since the PMP node needs access to multiple Master nodes in multiple piconets, a PMP-Master link cannot provide as great a bandwidth as a Master-Slave link. The end result is that the Master and PMP nodes have a smaller degree of freedom to provide a wider bandwidth link. For example, if one were to count either the Master-Slave link or the Master-PMP link as one hop, one may select a route that passes through a heavily loaded link, while bypassing a route with sufficient bandwidth resources and a relatively light load.

As was discussed above, the existing ad hoc routing protocols do not consider the characteristics of the Bluetooth™ network. For example, they view all Bluetooth™ nodes as nodes having similar load and bandwidth capacities, and they count either the Master-Slave link or the Master-PMP link as one hop when performing a route search.

On the other hand, some existing quality of service (QoS) routing protocols do determine a maximum bandwidth route, but they do so by sharing link bandwidth information between nodes. This approach thus requires a node to use its scarce bandwidth resource for exchanging the link bandwidth-related information. Furthermore, the use of this approach may be problematic in a Bluetooth™ network, since a Bluetooth™ node's link bandwidth is typically constantly varying due to radio interference and possibly other factors. This makes it difficult or even impractical to measure and exchange the link bandwidth data in real time.

Based on the foregoing it can be appreciated that problems exist with regard to applying current routing protocols to a Bluetooth™ network as, for example, the routing protocol may not bypass a node with a small bottleneck bandwidth or heavy load, and may miss finding a better route with a larger bottleneck bandwidth or lighter load.

SUMMARY OF THE PREFERRED EMBODIMENTS

The foregoing and other problems are overcome, and other advantages are realized, in accordance with the presently preferred embodiments of these teachings.

Disclosed is a route search metric based on node connectivity (i.e., the degree of a node) for optimizing routing protocol performance, such as the performance of a routing protocol known as MANET (Mobile Ad-hoc NETwork) for a wireless network. The presently preferred embodiment of the wireless network is one based on a Bluetooth™ Personal Area Network (PAN). The optimized routing protocol s with a consideration of a Bluetooth™ node's traffic condition or status, i.e., depending on whether the node's status is one of Master, Slave, or PMP. The use of this invention provides a routing protocol to enable a mobile node to bypass a heavily loaded node, and find a route having a larger bandwidth.

In one aspect this invention provides Equations for use in estimating a node's link bandwidth, and for calculating a connectivity metric based on the node's status and number of its Slaves.

In another aspect this invention provides a route search method to determine a route having a maximum link bandwidth and a minimum traffic load.

The Master, Slave, and PMP nodes are differentiated by their connectivity (i.e., the degree and number of neighbors). When the number of Slaves connecting to a Master increases, the link bandwidth between each Master-Slave link decreases proportionally. When a PMP node is connected to more than one piconet at one time, its link bandwidth to each of the associated Master nodes decreases proportionally. When these Bluetooth™ network characteristics are incorporated into the routing protocol, the performance of the Bluetooth™ PAN is significantly improved.

The route search method considers not only the number of hops from the source node to the destination node, but also the link properties of the Bluetooth™ node. Relatedly, this invention employs a simplified model that approximates the Bluetooth™ MAC (medium access control) algorithm. Based on this model, the network link bandwidth is estimated. The connectivity metric is defined as the ratio of the maximum link bandwidth to the estimated link bandwidth, where the maximum bandwidth is the maximum bandwidth between a Master and a Slave, when there is only one Slave present in the piconet. Comparing two adjacent links, the method determines the identity of the link having the greatest connectivity metric value and, hence, the smallest link bandwidth. A link having the largest connectivity metric value is identified as a bottleneck along the path from the source to the destination. By comparing the maximum link bandwidth along different paths, the method is enabled to select a route with a larger bottleneck bandwidth and a lower traffic load. To search for a route with the largest bottleneck bandwidth, the method first calculates the connectivity metric of all links along a plurality of routes, and then finds the maximum connectivity value of all routes. The route with smallest connectivity value is identified as the maximum bandwidth route.

By using the connectivity metric in accordance with this invention, the routing protocol can bypass a node with a small bottleneck bandwidth or heavy load, and locate a better route with a larger bottleneck bandwidth, thereby overcoming the problem that is present in the use of conventional routing protocols in a Bluetooth™ network.

This invention also overcomes the problem related to the difficulty in making bandwidth measurements that consume excessive resources. By using the connectivity metric one can obtain an approximation of the link bandwidth, i.e., the lower bound of a Bluetooth™ node's link bandwidth, without requiring a direct bandwidth measurement, or that the bandwidth information be exchanged between nodes.

A method in accordance with this invention is for routing data packets in a wireless network, preferably a Bluetooth™ network. The method includes estimating a link bandwidth of at least one network node, calculating a connectivity metric based on the estimated link bandwidth and using the calculated connectivity metric, determining a route having a maximum link bandwidth and a minimum traffic load. The method also includes distributing information concerning the calculated connectivity metric between network nodes. Preferably, estimating uses a model of a Bluetooth™ network medium access control MAC algorithm. The connectivity metric is defined as a ratio of a maximum link bandwidth to the estimated link bandwidth, where the maximum link bandwidth is the link bandwidth between a Master node and a Slave node when there is only one Slave node connected to the Master node (i.e., when there is one Slave node in the piconet with the Master node).

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 4 is a graph that plots $B_1$, $B_2$ vs. a; and

DETAILED DESCRIPTION OF THE PREFERRED EMBODIMENTS

In accordance with this invention, a method is first disclosed to estimate link bandwidth. A definition of the connectivity metric is then provided, as is a method to calculate the connectivity metric. A method to search for the maximum bandwidth route by using connectivity metric is then provided, as is an example that illustrates the usefulness of the connectivity metric in improving the efficiency of a route search.

The presently preferred method to estimate the link bandwidth is based on the following three assumptions.

Figure 2A:
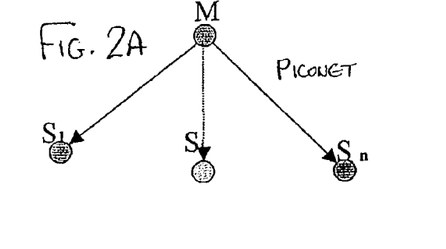
FIG. 2A illustrates one Master node connected to multiple Slave nodes.

(1) Referring to FIG. 2A, the first assumption is that a piconet Master node (M) accesses its Slave nodes ($S_1, \ldots, S_n$) in a round robin fashion (i.e., in a sequential, one-after-the-other manner).

Figure 2B:
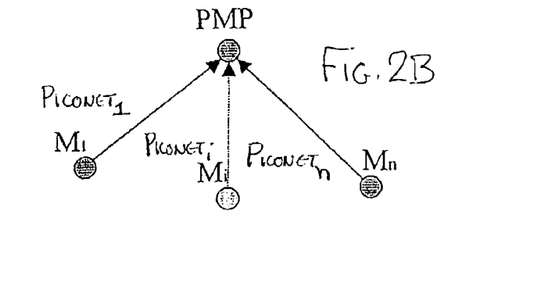
FIG. 2B shows one Slave node (a PMP node) connected to multiple Master nodes.

(2) Referring to FIG. 2B, the second assumption is that the PMP node (a node that participates in multiple piconets, but does not operate itself as a Master node in any one of the piconets) accesses Master nodes in different piconets (PICONET$_1, \ldots$, PICONET$_n$) for the same length of time.

Figure 2C:
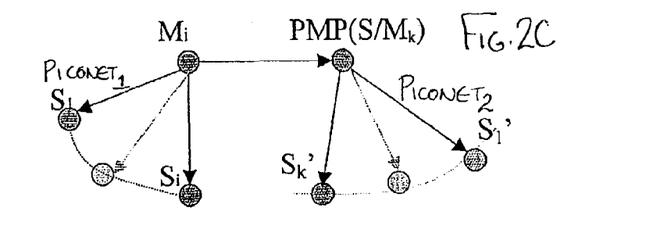
FIG. 2C shows a PMP node that simultaneously communicates with a Master node and its own Slave nodes.

(3) Referring to FIG. 2C, and in particular referring to the M/S PMP node (a node that accesses one piconet as a Slave (PICONET$_1$ in this case)), while also functioning as a Master in its own piconet (PICONET$_2$ in this case). The M/S PMP node's Master in another piconet (such as the node $M_i$ in FIG. 2C), determines the period of time that the M/S PMP node operates in the Master's piconet (PICONET$_1$ in this example). The M/S PMP node uses the remainder of the time to control its own piconet (PICONET$_2$), that is, to function as the Master node of its own piconet.

It can be noted that although the round robin is a very simple MAC algorithm to use when accessing multiple nodes, most Bluetooth™ inter-piconet/intra-piconet MAC methods have been developed on the basis of the simple round robin technique. If one obtains a time average, e.g., a sliding window average, of the bandwidth obtained from the use of the round robin approach, it will be found to approximate the simplified Bluetooth™ MAC model employed by the invention.

In general, the estimated bandwidth may be used as the lower bound of the link bandwidth, and will be found to be a good indicator of a node's actual link bandwidth and load level.

In the following Equations, the maximum bandwidth $B_0$ is the link bandwidth between the Master and Slave nodes, when there is only one Slave node present in a piconet, and all piconets have the same value of $B_0$. $M_i$ is the number of Slave nodes in piconet i, and $P_i$ is the number of piconets that the PMP node connects to. Bi is the bandwidth of the Master-Slave link in piconet i. Based on the foregoing, the following relationships are defined with reference to FIGS. 2A-2C:

$$\text{Master} \rightarrow \text{Slave: } \frac{B_i}{B_0} = \frac{1}{M_i} \tag{1}$$

$$\text{Slave} \rightarrow \text{Master: } \frac{B_i}{B_0} = \frac{1}{M_i} \tag{2}$$

$$\text{Master}_i \rightarrow PMP\ (S/S) \rightarrow \text{Master}_j: \frac{B}{B_0} = \tag{3}$$
$$\frac{1}{P_i}\text{MIN}\left(\frac{B_i}{B_o}, \frac{B_j}{B_o}\right) = \frac{1}{P_i}\text{MIN}\left(\frac{1}{M_i}, \frac{1}{M_j}\right), \text{ and}$$

$$\text{Master}_j \rightarrow PMP(S/M_k) \rightarrow \text{Slave: } \frac{B}{B_o} = \text{MIN}\left(\frac{1}{M_k+1}, \frac{1}{M_i}\right). \tag{4}$$

The situation that the PMP node participates in multiple piconets as a Slave node, and has its own piconet where it participates as a Master node, is intentionally omitted, as it will in general be too inefficient for use in multi-hop communication, and furthermore should be a rare case in a typical Bluetooth™ network. However, a similar formula to those shown above can be used to approximate the link bandwidth ratio, if desired.

According to the second assumption made above, two piconets do not synchronize with one another, i.e., the piconets operate asynchronously, and the PMP node participates in both piconets (to both piconets to which it is attached) for equal amounts of time. Thus, although Master i can provide the maximum bandwidth of $B_i$, the PMP node may not be responding to piconet i when Master i attempts to send a packet to the PMP node. As such, the bandwidth between the PMP node and Master i is preferably multiplexed by the probability that the PMP node will be found, at any given time, to be responsive to piconet i. As a result, the Master-PMP-Master link is the minimum of two Master-PMP links. Similarly, according to the third assumption, the PMP (S/M) first guarantees its participation in the link with Master i, and then uses the remainder of the time to control its own Master. A proof of Equation (4) is given below.

Based on the foregoing, the definition of a connectivity metric is as follows: the ratio of the maximum link bandwidth to the estimated link bandwidth, where the maximum link bandwidth is the link bandwidth between Master and Slave when there is only one Slave in the piconet. The estimated link bandwidth maybe calculated by the formulas shown above. The detailed metric is shown in Table 1, which shows the connectivity metric for the different link status.

TABLE 1

| Link Property | connectivity metric<br>Connectivity Metric (C) |
|---|---|
| Master-Slave: | $M_i$ |
| Slave-Master | $M_i$ |
| Master-PMP (S/S)-Master | $P_i * MAX(M_i M_j)$ |
| Master---PMP(M/S)-Slave | $MAX(M_k + 1, M_i)$ |

In Table 1 Mi is the number of Slave nodes in piconet i, and Pi is the number of Master nodes that a PMP node connects to.

When comparing two adjacent links, it can be noticed that the link with the larger connectivity metric has the smaller link bandwidth. The link with largest connectivity metric value can thus be referred to a bottleneck along the path from the source to destination. Based on this observation, one can find the bottleneck bandwidth, and thereby facilitate the search for a maximum bandwidth route.

Figure 3:
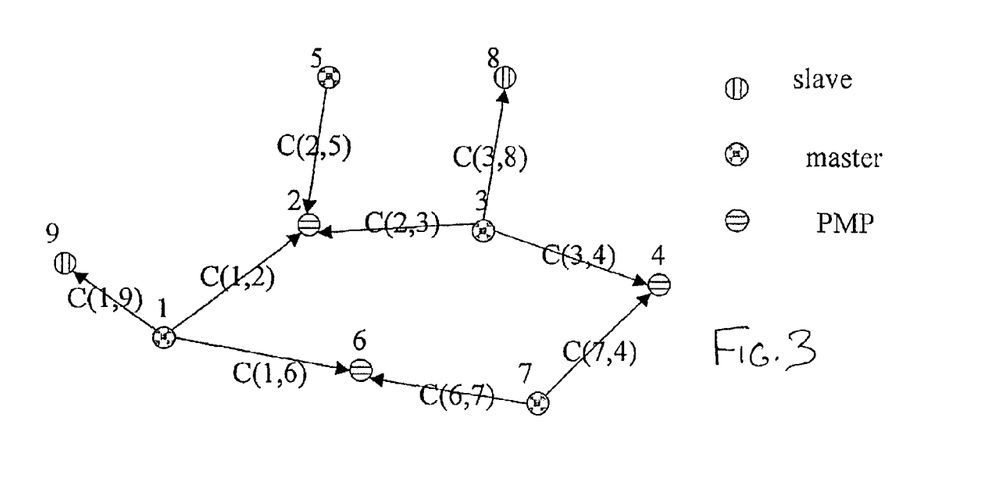
FIG. 3 is an example of a scatternet route search.

Referring to FIG. 3, and by example, assume that source node 1 attempts to send data packets to destination node 4. If the hop number is used as the routing metric, one can only select the route between (1-2-3-4) and (1-6-7-4) randomly, because they have the same hop number. However, by using the connectivity metric in accordance with this invention, one can determine that the route (1-6-7-4) has a larger bottleneck bandwidth.

In general, a routing protocol can be categorized as providing reactive routing and proactive routing. In reactive routing, when the source node wants to send a packet, it first broadcast a route request (RREQ) to request a route to destination. The destination replies to the RREQ with a route reply (RREP). The metric (e.g., the number of hops, or the connectivity metric in accordance with this invention) is attached to the RREP packet. When the source node receives the RREP from multiple routes, it determines the optimal route based on the route metric attached to each RREP.

In the case of FIG. 3, when node 1 desires a route to node 4, it broadcasts the RREQ. The RREQ arrives at node 4 through two paths (1-2-3-4) and (1-6-7-4). Node 4 replies to each RREQ with a RREP. The intermediate nodes update the route metric in the RREP (e.g., increase the hop count in the RREP by one or calculate the connectivity metric as described herein). When the two RREP packets arrive at node 1, node 1 compares the metric found in each RREP, and selects a route based on the received metrics.

In proactive routing, the source node collects information about each link or path to all destinations, and then calculates the optimal path itself The route connectivity metric can be used to replace the number of hops used in conventional routing protocols, and is independent of the particular type of routing protocol that is in use. By example only, the connectivity metric can be used with the ad hoc routing protocol discussed above.

In the case of FIG. 3, the connectivity metric of each link is assumed to be as follows:

C(1,2)=9; C(2,3)=9; C(3,4)=6; C(1,6)=6; C(6,7)=4; C(7,4) =2;

C(1-2-3-4)=MAX(C(1,2), C(2,3),C(3,4))=9,

C(1-6-7-4)=MAX(C(1 6),C(6,7),C(7,4))=6

It can then be determined by the source node 1 that route (1-6-7-4) has a smaller maximum connectivity metric, or in other words, a wider link bandwidth and a smaller traffic load than route (1-2-3-4), and is thus the better route between source node 1 and destination node 4.

Theorem: the maximum bandwidth of a Master—PMP (M/S)—Slave link B is, as was shown above for Equation (4):

$$\frac{B}{B_o} = \text{MIN}\left(\frac{1}{M_i}, \frac{1}{M_k + 1}\right)$$

Proof:

Assuming the Master-PMP-Slave network as shown in FIG. 2C, define $b_1$ as the ratio of link $M_i$-$M_k$'s maximum bandwidth to $B_0$, and define $b_2$ as the ratio of the maximum bandwidth between link $M_k$ and its Slaves to $B_0$.

The maximum value of $b_1$ is $$\frac{1}{M_i},$$

and $b_2$ is influenced by the amount of bandwidth used or consumed by the link between $M_i$ and $M_k$. Denote a as the used bandwidth ratio of link $M_i \rightarrow M_k$, and a is found by:

$$a \in \left(0, \frac{1}{M_i}\right),$$

$$b_2 = (1 - a)\frac{1}{M_k}, \text{ and}$$

$$b_1 = a.$$

Figure 4:
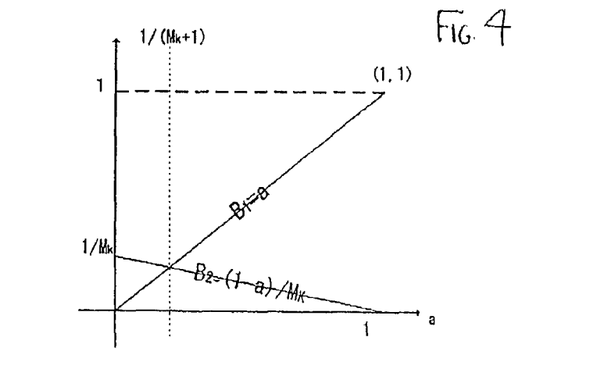

Reference can also be made to the graph shown in FIG. 4.

The target b is the one that maximizes the minimum of $b_1 b_2$.

As is shown in FIG. 4, if the range of a can cover the point $$\frac{1}{M_k+1},$$

the maximum of b is achieved when $b_1$ is equal to $b_2$. If the range of a cannot cover this point, the maximum of b is the maximum of a according to FIG. 4.

$$b = \begin{Bmatrix} \frac{1}{M_k+1} \\ \frac{1}{M_i} \end{Bmatrix} \frac{1}{M_i} > \frac{1}{M_k+1} \text{ and } \frac{1}{M_i} \le \frac{1}{M_k+1} = \text{MIN}\left(\frac{1}{M_i}, \frac{1}{M_k+1}\right)$$

One can compare this result with Equation (4) given above, and the correctness of the theorem is proved.

There is a trend developing that a Bluetooth™ node provide a PAN/BNEP mechanism to the IP layer (see FIG. 1), and runs under the IP layer as single segment, such as Ethernet. As such, it is likely that the routing protocol will operate at the Bluetooth Network Encapsulation Protocol (BNEP) layer (see "Bluetooth Network Encapsulation Protocol (BNEP) Specification", Revision 1.0RC3, Bluetooth SIG, Inc., Dec. 17, 2002) and export the entire scatternet as a single Ethernet segment in future implementations of the Bluetooth™ standard. The algorithm in accordance with this invention may be incorporated in either the Bluetooth™ link-state, or in a distance-vector type of routing protocol, to realize such an Ethernet-like scenario. In addition, the algorithm may also be implemented in the IP layer.

There are at least two approaches to implementing the presently preferred embodiment of the routing algorithm. In a first approach, the connectivity may be as the sole metric for the route search. The hop count field used in most routing protocols can be used to store the connectivity metric, and it is not necessary to modify the pre-existing routing protocol packet format. In a second approach, the connectivity metric is used in conjunction with another routing protocol metric, such as the hop count. In this approach, the protocol data format is modified to incorporate the connectivity metric, but an advantage is gained in that there is more flexibility to find a best route by considering multiple types of routing metrics (e.g., the hop count and the connectivity).

Figure 5:
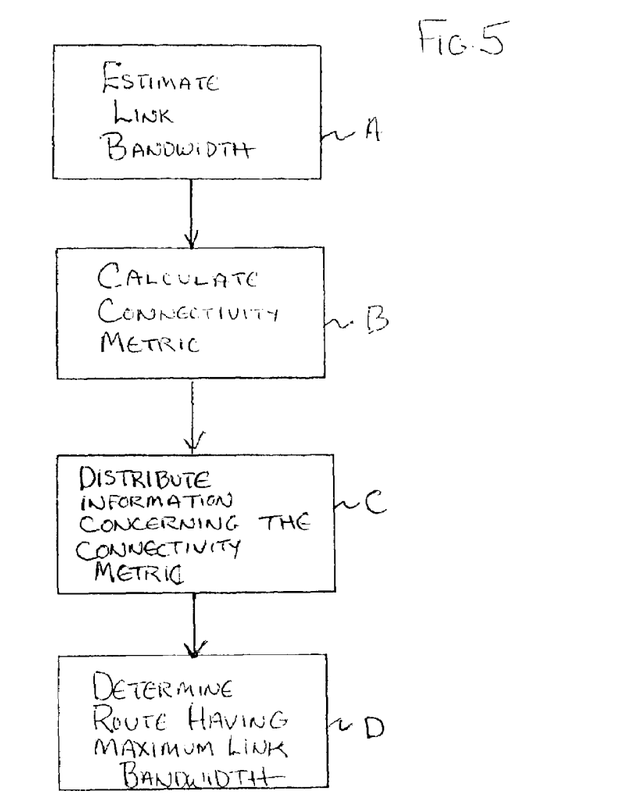
FIG. 5 is a logic flow diagram in accordance with a method of this invention.

Referring to FIG. 5, a method in accordance with this invention is for routing data packets in a wireless network, preferably a Bluetooth™ network. The method includes:

(Step A) estimate the link bandwidth;

(Step B) calculate connectivity metric on all nodes locally;

(Step C) distribute information about the connectivity metric among network nodes (either proactive or reactive), this Step representing at least in part the route search process; and (Step D) determine the route having the maximum link bandwidth at the source node.

Preferably, the estimating step uses a model of a Bluetooth™ network medium access control MAC algorithm. The connectivity metric is defined as a ratio of a maximum link bandwidth to the estimated link bandwidth, where the maximum link bandwidth is the link bandwidth between a Master node and a Slave node when there is only one Slave node connected to the Master node (i.e., when there is one Slave node in the piconet with the Master node).

This invention also pertains to a computer program that operates a network data processor, such as a data processor located in a mobile network node, such as a cellular telephone, or in a fixed network node, for executing the routing method outlined above.

The foregoing description has provided by way of exemplary and non-limiting examples a full and informative description of the best method and apparatus presently contemplated by the inventor for carrying out the invention. However, various modifications and adaptations may become apparent to those skilled in the relevant arts in view of the foregoing description, when read in conjunction with the accompanying drawings and the appended claims. As but some examples, the use of other similar or equivalent routing protocols and corresponding wireless network types, numbers of nodes, types of nodes and the like may be attempted by those skilled in the art. However, all such and similar modifications of the teachings of this invention will still fall within the scope of this invention. Further, while the method and apparatus described herein are provided with a certain degree of specificity, the present invention could be implemented with either greater or lesser specificity, depending on the needs of the user. Further, some of the features of the present invention could be used to advantage without the corresponding use of other features. As such, the foregoing description should be considered as merely illustrative of the principles of the present invention, and not in limitation thereof, as this invention is defined by the claims which follow.

What is claimed is:

1. A method of selecting a route for communicating information in a communication network, the method comprising:

receiving a connectivity metric for each of a plurality of links defining each of a plurality of routes that connect a start node with an end node, each link of the plurality of links including a first node and a second node, wherein the first node is a first type of node selected from a first master node, a first slave node, and a first multiple network participant node, wherein the second node is a second type of node selected from a second master node, a second slave node, and a second multiple network participant node, and further wherein the received connectivity metric for a link of the plurality of links is determined based on the first type of node and the second type of node;

determining a total connectivity metric for each of the plurality of routes based on the received connectivity metric for each of the plurality of links defining each of the plurality of routes; and selecting a route in a communication network for communicating information between the start node and the end node from the plurality of routes based on the determined total connectivity metric.

2. The method of claim 1 wherein, if the first node is the first master node in a sub-network of the communication network and the second node is the second slave node in the sub-network, the connectivity metric is a number of slave nodes in the sub-network.

3. The method of claim 1 wherein, if the second node is the second master node in a sub-network of the communication network and the first node is the first slave node in the sub-network, the connectivity metric is a number of slave nodes in the sub-network.

4. The method of claim 1 wherein the first multiple network participant node comprises a first master multiple network participant node and a first slave multiple network participant node wherein the first master multiple network participant node participates in a sub-network of the communication network as a master node, and further wherein the first slave multiple network participant node does not participate in the communication network as a master node.

5. The method of claim 4 wherein, if the first node is the first slave multiple network participant node between a first sub-network and a second sub-network and the second node is the second master node in the second sub-network, the received connectivity metric is calculated at least in part by solving $P_i*MAX(M_i, M_j)$ where $P_i$ is a number of master nodes that the first node connects to in the communication network, $M_i$ is a first number of slave nodes in the first sub-network, and $M_j$ is a second number of slave nodes in the second sub-network.

6. The method of claim 4 wherein, if the first node is the first master multiple network participant node and the first node participates as a master node in a first sub-network and the second node is the second master node in a second sub-network, the received connectivity metric is calculated at least in part by solving $MAX(M_k+1, M_i)$ where $M_k$ is a first number of slave nodes in the first sub-network, and $M_i$ is a second number of slave nodes in the second sub-network.

7. The method of claim 4 wherein, if the first node is the first slave multiple network participant node between a first sub-network and a second sub-network and the second node is the second master node in the second sub-network, the received connectivity metric is calculated at least in part by solving $$\text{Master} \to \text{Slave: } \frac{B_i}{B_0} = \frac{1}{M_i}$$

$$\text{Slave} \to \text{Master: } \frac{B_i}{B_0} = \frac{1}{M_i}$$

$$\text{Master}_i \to PMP\,(S/S) \to \text{Master}_j: \frac{B}{B_0} = \frac{1}{P_i}\text{MIN}\left(\frac{B_i}{B_o}, \frac{B_j}{B_o}\right) = \frac{1}{P_i}\text{MIN}\left(\frac{1}{M_i}, \frac{1}{M_j}\right), \text{ and}$$

$$\text{Master}_j \to PMP(S/M_k) \to \text{Slave: } \frac{B}{B_o} = \text{MIN}\left(\frac{1}{M_k+1}, \frac{1}{M_i}\right).$$

where $P_i$ is a number of master nodes that the first node connects to in the communication network, $B_i$ is a first estimated bandwidth of a master node of the first sub-network, $B_j$ is a second estimated bandwidth of the second node, and $B_0$ is a maximum bandwidth between the master node of the first sub-network and a slave node of the first sub-network.

8. The method of claim 7 further comprising estimating the first estimated bandwidth and estimating the second estimated bandwidth.

9. The method of claim 8 wherein estimating the first estimated bandwidth comprises use of a model of a network medium access control algorithm.

10. The method of claim 8 wherein estimating the first estimated bandwidth comprises use of a model of a Bluetooth network medium access control algorithm.

11. The method of claim 4 wherein, if the first node is the first master multiple network participant node and the first node participates as a master node in a first sub-network and the second node is the second master node in a second sub-network, the received connectivity metric is calculated at least in part by solving $$MAX\left(\frac{B_0}{B_k}+1, \frac{B_0}{B_i}\right)$$

where $B_i$ is a first estimated bandwidth of the second node, $B_k$ is a second estimated bandwidth of the first node, and $B_0$ is a maximum bandwidth between the first node and a slave node of the first sub-network.

12. The method of claim 1 wherein determining the total connectivity metric of a route of the plurality of routes comprises identifying a maximum connectivity metric of the plurality of links defining the route.

13. The method of claim 1 further comprising communicating the received connectivity metric to a node of the communication network.

14. The method of claim 13 wherein communicating the received connectivity metric comprises inserting the calculated connectivity metric into a routing protocol packet.

15. The method of claim 14 wherein the received connectivity metric is inserted into the routing protocol packet in place of a hop number.

16. The method of claim 1, wherein the connectivity metric for each of the plurality of links is based on a ratio of a maximum link bandwidth to an estimated link bandwidth, wherein the maximum link bandwidth is a link bandwidth between a master node and a slave node when there is only one slave node connected to the master node., and wherein the estimated link bandwidth is an estimate of a current bandwidth capacity of a respective link of the plurality of links.

17. A computer-readable medium including computer-readable instructions that, upon execution by a processor, cause the processor to select a route for communicating information in a communication network, the instructions configured to cause a computing device to:
receive a connectivity metric for each of a plurality of links defining each of a plurality of routes that connect a start node with an end node, each link of the plurality of links including a first node and a second node, wherein the first node is a first type of node selected from a first master node, a first slave node, and a first multiple network participant node, wherein the second node is a second type of node selected from a second master node, a second slave node, and a second multiple network participant node, and further wherein the received connectivity metric for a link of the plurality of links is determined based on the first type of node and the second type of node;
determine a total connectivity metric for each of the plurality of routes based on the received connectivity metric for each of the plurality of links defining each of the plurality of routes; and
select a route in a communication network for communicating information between the start node and the end node from the plurality of routes based on the determined total connectivity metric.

18. The computer-readable medium of claim 17 wherein, if the first node is the first master node in a sub-network of the communication network and the second node is the second slave node in the sub-network, the connectivity metric is a number of slave nodes in the sub-network.

19. The computer-readable medium of claim 17 wherein, if the second node is the second master node in a sub-network of the communication network and the first node is the first slave node in the sub-network, the connectivity metric is a number of slave nodes in the sub-network.

20. The computer-readable medium of claim 17 wherein the first multiple network participant node comprises a first master multiple network participant node and a first slave multiple network participant node wherein the first master multiple network participant node participates in a sub-network of the communication network as a master node, and further wherein the first slave multiple network participant node does not participate in the communication network as a master node.

21. The computer-readable medium of claim 20 wherein, if the first node is the first slave multiple network participant node between a first sub-network and a second sub-network and the second node is the second master node in the second sub-network, the received connectivity metric is calculated at least in part by solving $P_i*MAX(M_i, M_j)$ where $P_i$ is a number of master nodes that the first node connects to in the communication network, $M_i$ is a first number of slave nodes in the first sub-network, and $M_j$ is a second number of slave nodes in the second sub-network.

22. The computer-readable medium of claim 20 wherein, if the first node is the first master multiple network participant node and the first node participates as a master node in a first sub-network and the second node is the second master node in a second sub-network, the received connectivity metric is calculated at least in part by solving $MAX(M_k+1, M_i)$ where $M_k$ is a first number of slave nodes in the first sub-network, and $M_i$ is a second number of slave nodes in the second sub-network.

23. The computer-readable medium of claim 20 wherein, if the first node is the first slave multiple network participant node between a first sub-network and a second sub-network and the second node is the second master node in the second sub-network, the received connectivity metric is calculated at least in part by solving $$\text{Master} \to \text{Slave: } \frac{B_i}{B_0} = \frac{1}{M_i}$$

$$\text{Slave} \to \text{Master: } \frac{B_i}{B_0} = \frac{1}{M_i}$$

$$\text{Master}_i \to PMP(S/S) \to \text{Master}_j: \frac{B}{B_0} = \frac{1}{P_i}\text{MIN}\left(\frac{B_i}{B_o}, \frac{B_j}{B_o}\right) = \frac{1}{P_i}\text{MIN}\left(\frac{1}{M_i}, \frac{1}{M_j}\right), \text{ and}$$

$$\text{Master}_j \to PMP(S/M_k) \to \text{Slave: } \frac{B}{B_o} = \text{MIN}\left(\frac{1}{M_k+1}, \frac{1}{M_i}\right).$$

where $P_i$ is a number of master nodes that the first node connects to in the communication network, $B_i$ is a first estimated bandwidth of a master node of the first sub-network, $B_j$ is a second estimated bandwidth of the second node, and $B_0$ is a maximum bandwidth between the master node of the first sub-network and a slave node of the first sub-network.

24. The computer-readable medium of claim 17 wherein determining the total connectivity metric of a route of the plurality of routes comprises identifying a maximum connectivity metric of the plurality of links defining the route.

25. The computer-readable medium of claim 17, wherein the connectivity metric for each of the plurality of links is based on a ratio of a maximum link bandwidth to an estimated link bandwidth, wherein the maximum link bandwidth is a link bandwidth between a master node and a slave node when there is only one slave node connected to the master node, and wherein the estimated link bandwidth is an estimate of a current bandwidth capacity of a respective link of the plurality of links.

26. A device for selecting a route for communicating information in a communication network, the device comprising:
a data processor, the data processor configured to
receive a connectivity metric for each of a plurality of links defining each of a plurality of routes that connect a start node with an end node, each link of the plurality of links including a first node and a second node, wherein the first node is a first type of node selected from a first master node, a first slave node, and a first multiple network participant node, wherein the second node is a second type of node selected from a second master node, a second slave node, and a second multiple network participant node, and further wherein the received connectivity metric for a link of the plurality of links is determined based on the first type of node and the second type of node;
determine a total connectivity metric for each of the plurality of routes based on the received connectivity metric for each of the plurality of links defining each of the plurality of routes; and
select a route in a communication network for communicating information between the start node and the end node from the plurality of routes based on the determined total connectivity metric; and
a communication interface, the communication interface configured to communicate the information to a communication network based on the selected route.

27. The device of claim 26 wherein, if the first node is the first master node in a sub-network of the communication network and the second node is the second slave node in the sub-network, the connectivity metric is a number of slave nodes in the sub-network.

28. The device of claim 26 wherein the first multiple network participant node comprises a first master multiple network participant node and a first slave multiple network participant node wherein the first master multiple network participant node participates in a sub-network of the communication network as a master node, and further wherein the first slave multiple network participant node does not participate in the communication network as a master node.

29. The device of claim 28 wherein, if the first node is the first slave multiple network participant node between a first sub-network and a second sub-network and the second node is the second master node in the second sub-network, the received connectivity metric is calculated at least in part by solving $P_i*MAX(M_i, M_j)$ where $P_i$ is a number of master nodes that the first node connects to in the communication network, $M_i$ is a first number of slave nodes in the first sub-network, and $M_j$ is a second number of slave nodes in the second sub-network.

30. The device of claim 28 wherein, if the first node is the first master multiple network participant node and the first node participates as a master node in a first sub-network and the second node is the second master node in a second sub-network, the received connectivity metric is calculated at least in part by solving $MAX(M_k+1, M_i)$ where $M_k$ is a first number of slave nodes in the first sub-network, and $M_i$ is a second number of slave nodes in the second sub-network.

31. The device of claim 28 wherein, if the first node is the first slave multiple network participant node between a first sub-network and a second sub-network and the second node is the second master node in the second sub-network, the received connectivity metric is calculated at least in part by solving $$\text{Master} \rightarrow \text{Slave: } \frac{B_i}{B_0} = \frac{1}{M_i}$$

$$\text{Slave} \rightarrow \text{Master: } \frac{B_i}{B_0} = \frac{1}{M_i}$$

$$\text{Master}_i \rightarrow PMP\,(S/S) \rightarrow \text{Master}_j: \frac{B}{B_0} =$$

$$\frac{1}{P_i}\text{MIN}\left(\frac{B_i}{B_o}, \frac{B_j}{B_o}\right) = \frac{1}{P_i}\text{MIN}\left(\frac{1}{M_i}, \frac{1}{M_j}\right), \text{ and}$$

$$\text{Master}_j \rightarrow PMP(S/M_k) \rightarrow \text{Slave: } \frac{B}{B_o} = \text{MIN}\left(\frac{1}{M_k+1}, \frac{1}{M_i}\right).$$

where $P_i$ is a number of master nodes that the first node connects to in the communication network, $B_i$ is a first estimated bandwidth of a master node of the first sub-network, $B_j$ is a second estimated bandwidth of the second node, and $B_0$ is a maximum bandwidth between the master node of the first sub-network and a slave node of the first sub-network.

32. The device of claim 26 wherein determining the total connectivity metric of a route of the plurality of routes comprises identifying a maximum connectivity metric of the plurality of links defining the route.

33. The device of claim 26, wherein the connectivity metric for each of the plurality of links is based on a ratio of a maximum link bandwidth to an estimated link bandwidth, wherein the maximum link bandwidth is a link bandwidth between a master node and a slave node when there is only one slave node connected to the master node, and wherein the estimated link bandwidth is an estimate of a current bandwidth capacity of a respective link of the plurality of links.

* * * * *